United States Patent
Hatano et al.

(10) Patent No.: US 11,479,011 B2
(45) Date of Patent: Oct. 25, 2022

(54) DECORATIVE MOLDED ARTICLE

(71) Applicant: Dai Nippon Printing Co., Ltd., Tokyo (JP)

(72) Inventors: Masahiro Hatano, Kashiwa (JP); Takayuki Shimada, Saitama (JP); Kentaro Akiyama, Moriya (JP); Kazuki Takizawa, Asako (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 221 days.

(21) Appl. No.: 16/625,550

(22) PCT Filed: Jun. 6, 2018

(86) PCT No.: PCT/JP2018/021744
§ 371 (c)(1),
(2) Date: Dec. 20, 2019

(87) PCT Pub. No.: WO2019/003843
PCT Pub. Date: Jan. 3, 2019

(65) Prior Publication Data
US 2021/0323264 A1    Oct. 21, 2021

(30) Foreign Application Priority Data

Jun. 28, 2017    (JP) .............................. JP2017-126454

(51) Int. Cl.
*B32B 3/26* (2006.01)
*B32B 7/12* (2006.01)
(Continued)

(52) U.S. Cl.
CPC ................ *B32B 3/263* (2013.01); *B32B 7/12* (2013.01); *B32B 37/025* (2013.01);
(Continued)

(58) Field of Classification Search
CPC ................ B32B 3/263; B32B 2451/00; B32B 2307/416; G02B 5/0221; G02B 5/0231; G02B 5/0205
See application file for complete search history.

(56) References Cited

U.S. PATENT DOCUMENTS 5,550,429 A *  8/1996 Hayama ................ H01J 29/868
                                                        313/479
8,877,104 B2 * 11/2014 Iwata ....................... G02B 1/111
                                                         264/1.7
(Continued)

FOREIGN PATENT DOCUMENTS

CN        1517725 A        8/2004
CN      101484829 A        7/2009
(Continued)

OTHER PUBLICATIONS

Office Action dated Jul. 19, 2021, issued for Chinese Patent Application No. 201880042947.5.
International Search Report dated Aug. 21, 2018, issued for PCT/JP2018/021744.

*Primary Examiner* — Joanna Pleszczynska
(74) *Attorney, Agent, or Firm* — Locke Lord LLP

(57) ABSTRACT

Provided is a decorative molded article that uniformizes the brightness of an uneven surface and inhibits whitening. The decorative molded article is provided with a protective layer having an uneven surface on an adherend, and satisfying the following requirement 1-1: <Requirement 1-1> A black plate is stuck to the surface of the article on the adherend side thereof via a transparent pressure-sensitive adhesive layer to prepare a sample A. A visible light inclined by 10 degrees from the normal direction of the sample A is made to run into the uneven surface, and based on the specular direction of the incident light as a reference angle, a lumi- (Continued)

nous reflectance is measured every 0.2 degrees within a range of the reference angle±5.0 degrees.

11 Claims, 6 Drawing Sheets

(51) Int. Cl.
  *G02B 5/02* (2006.01)
  *B32B 37/00* (2006.01)
  *B44C 1/17* (2006.01)
(52) U.S. Cl.
  CPC .......... *B44C 1/1712* (2013.01); *G02B 5/0221* (2013.01); *G02B 5/0231* (2013.01); *B32B 2451/00* (2013.01)

(56) References Cited

U.S. PATENT DOCUMENTS

2004/0209113 A1 10/2004 Kuwabara et al.
2010/0296169 A1 11/2010 Mizuno

FOREIGN PATENT DOCUMENTS

| CN | 104834035 A | 8/2015 |
| JP | 2010-271424 A | 12/2010 |
| JP | 2011-218675 A | 11/2011 |
| JP | 5095598 B2 | 12/2012 |
| JP | 2016-12095 A | 1/2016 |
| JP | 2016-150451 A | 8/2016 |

\* cited by examiner

[Fig. 1]
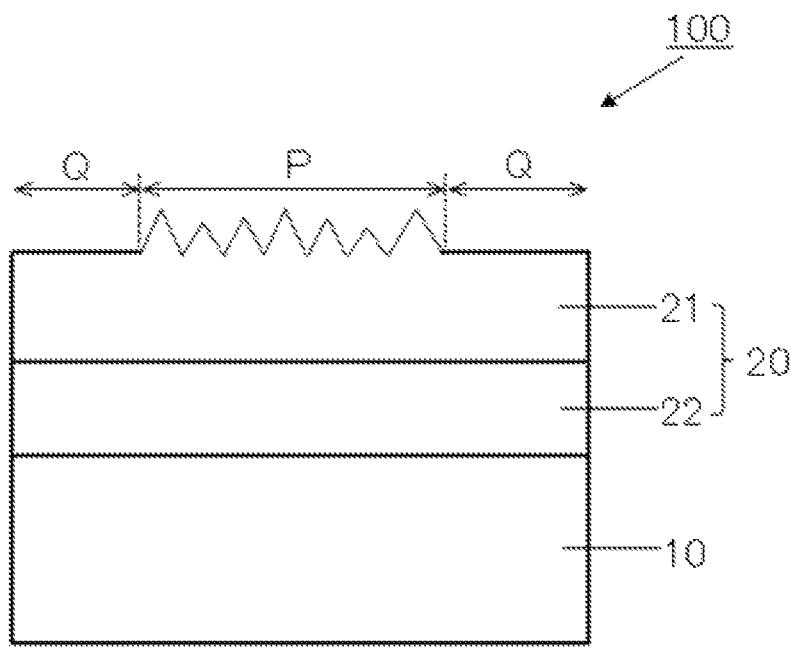

[Fig. 2]
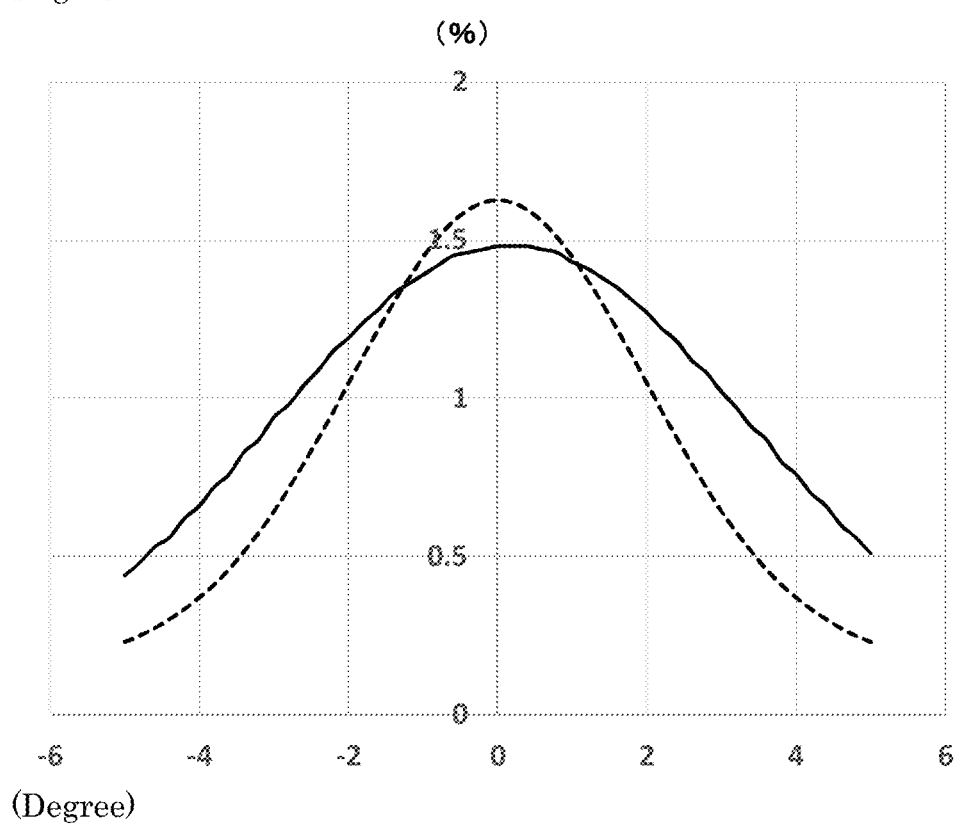

[Fig. 3]
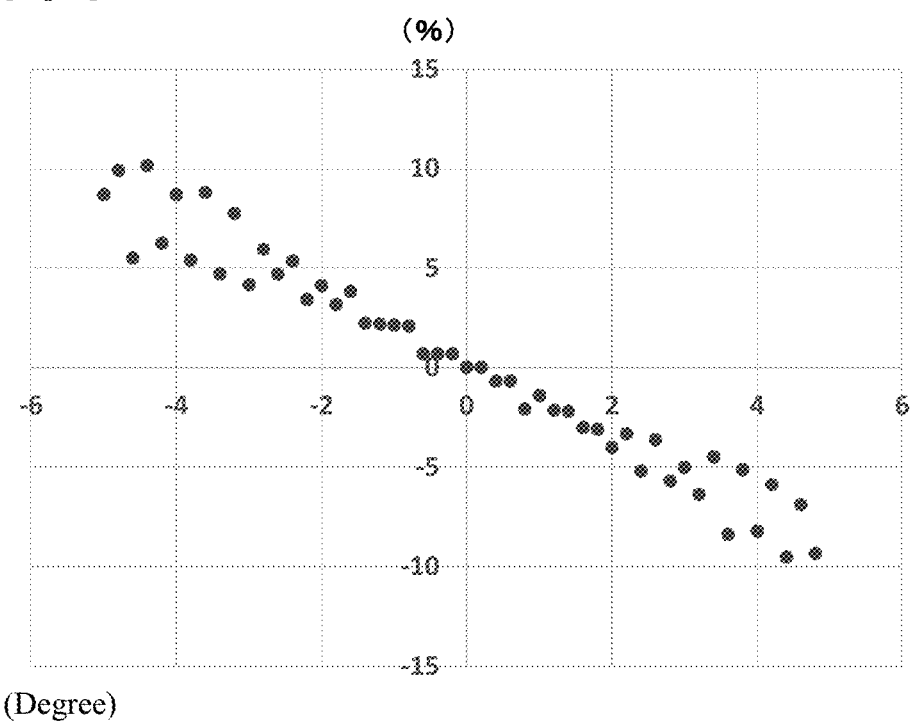

[Fig. 4]
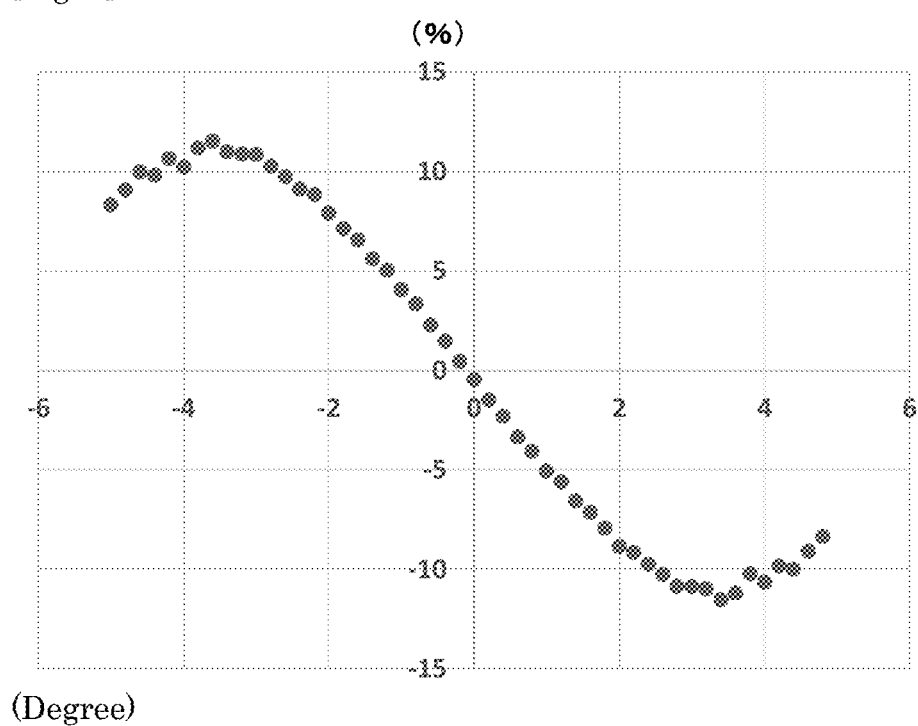

[Fig. 5]
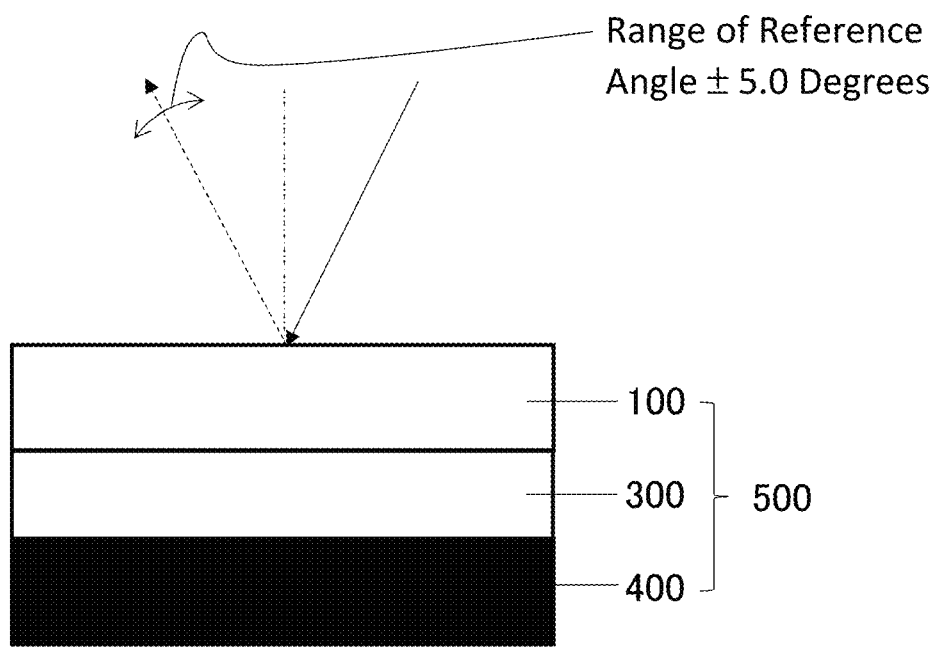
[Fig. 6]
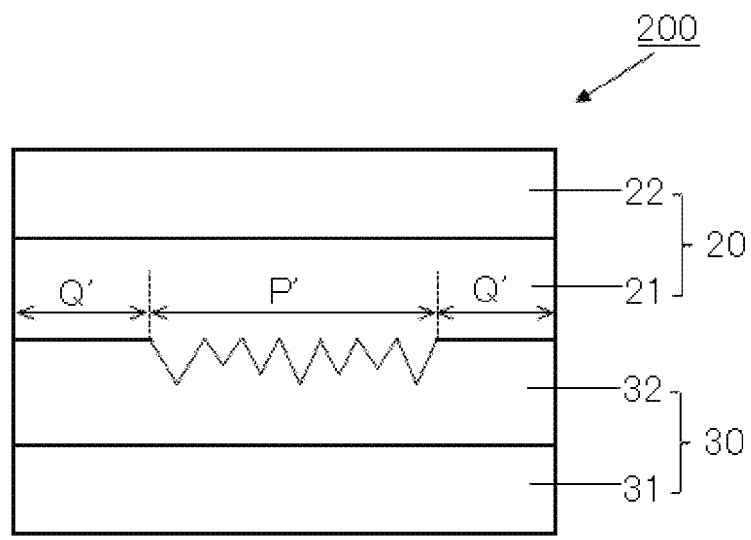

[Fig. 7]
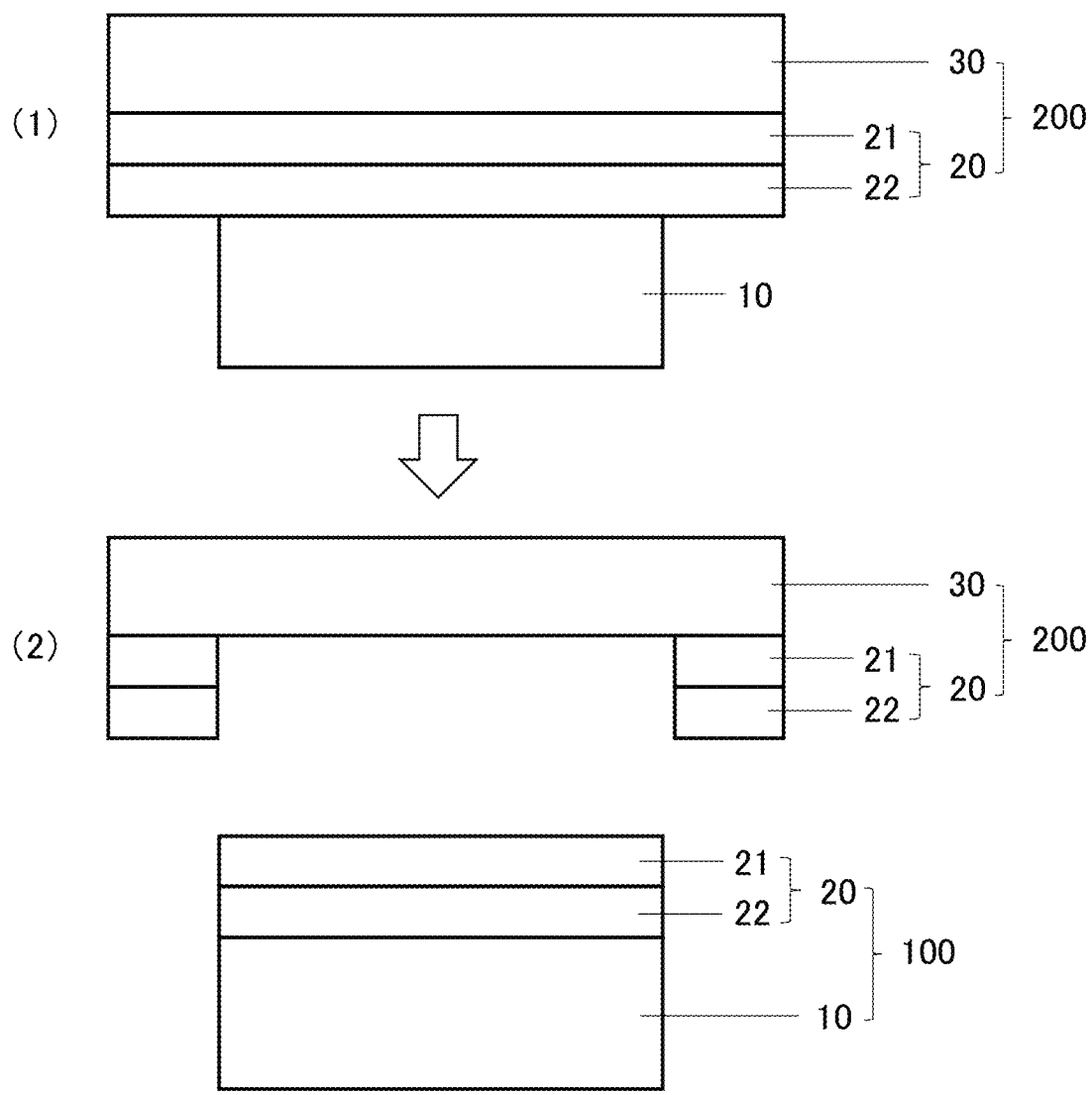

DECORATIVE MOLDED ARTICLE

TECHNICAL FIELD

The present invention relates to a decorative molded article, a method for producing a decorative molded article, a transfer sheet and a display device.

BACKGROUND ART

Heretofore, in the field of household appliances, car interior parts and sundry articles, high-level functionality and design decorativeness have been expressed by decorating adherend surfaces with letters or patterns.

One method of decorating adherend surfaces is a transfer method. A transfer method is a method using a transfer sheet prepared by forming a transfer layer including a release layer, a pattern layer and an adhesive layer on a substrate, in which the transfer layer is airtightly adhered to an adherend by pressure under heat and then the substrate is peeled to thereby transfer the transfer layer alone on the surface of the adherend for decorating the adherend surface.

Depending on use in some cases, adherend surfaces are required to have excellent design decorativeness having different textures such as glossy texture and matted texture as combined.

For example, PTL 1 discloses a partially-matted transfer sheet having, as formed on a substrate sheet, a release layer entirely containing a matting agent, a mask layer partially containing an active energy-curable resin, and as a transfer layer, a release layer and a pattern layer. With that, PTL 1 discloses a partially-matted transfer-molded article obtained by airtightly adhering the transfer side of the transfer sheet to a surface of an adherend, then keeping the transfer layer in contact with the surface of the adherend by applying heat and pressure from the substrate sheet side of the transfer sheet, and thereafter releasing the substrate sheet, the release layer and the mask layer.

CITATION LIST

Patent Literature

PTL 1: Japanese Patent 5095598

SUMMARY OF INVENTION

Technical Problem

However, in the partially-matted transfer-molded article described in PTL 1, the brightness of the transfer layer after transfer is not uniform, and therefore the article looks unattractive. Further, the surface of the partially-matted transfer-molded article described in PTL 1 often looks whitish.

The present invention has been made in consideration of such situations, and its object is to provide a decorative molded article having a uniform brightness on the surface thereof and prevented from whitening, a method for producing the decorative molded article, a transfer sheet for use for the decorative molded article, and a display device using the decorative molded article.

Solution to Problem

For solving the above-mentioned problems, the present invention provides the following [1] to [4].

[1] A decorative molded article provided with a protective layer having an uneven surface on an adherend, and satisfying the following requirement 1-1:
<Requirement 1-1>
A black plate is stuck to the surface of the article on the adherend side thereof via a transparent pressure-sensitive adhesive layer to prepare a sample A; a visible light inclined by 10 degrees from the normal direction of the sample A is made to run into the uneven surface, and based on the specular direction of the incident light as a reference angle, a luminous reflectance is measured every 0.2 degrees within a range of the reference angle±5.0 degrees; when the luminous reflectance at −5.0 degrees relative to the reference angle is represented by $Y_{-5.0}$ and the luminous reflectance at −4.8 degrees is represented by $Y_{-4.8}$, a value represented by an expression of $[(Y_{-4.8}-Y_{-5.0})/((Y_{-4.8}+Y_{-5.0})/2)]\times 100$ is defined as a change rate of the luminous reflectance at −5.0 degrees; and when a change rate of the luminous reflectance at every measurement angle in a range of −5.0 degrees to +4.8 degrees is calculated according to the expression and an approximate straight line is drawn according to a least-square method in which the x-axis indicates the measurement angle and the y-axis indicates the change rate, the slope of the approximate straight line is −2.00 or more and −0.90 or less.

[2] A transfer sheet having a protective layer on a release sheet, in which at least a part of the surface of the release sheet on the side thereof kept in contact with the protective layer has an uneven surface, and which satisfies the following requirement 2-1;
<Requirement 2-1>
The transfer sheet is stuck to a black plate via a transparent pressure-sensitive adhesive layer on the surface of the protective layer side of the transfer sheet, and then the release sheet is released to prepare a sample B having, in that order, the black plate, the transparent pressure-sensitive adhesive layer and the protective layer provided with a surface profile complementary to the surface profile of the transfer sheet; a visible light inclined by 10 degrees from the normal direction of the sample B is made to run into the uneven surface of the protective layer, and based on the specular direction of the incident light as a reference angle, a luminous reflectance is measured every 0.2 degrees within a range of the reference angle±5.0 degrees; when the luminous reflectance at −5.0 degrees relative to the reference angle is represented by $Y_{-5.0}$ and the luminous reflectance at −4.8 degrees is represented by $Y_{-4.8}$, a value represented by an expression of $[(Y_{-4.8}-Y_{-5.0})/((Y_{-4.8}+Y_{-5.0})/2)]\times 100$ is defined as a change rate of the luminous reflectance at −5.0 degrees; and when a change rate of the luminous reflectance at every measurement angle in a range of −5.0 degrees to +4.8 degrees is calculated according to the expression and an approximate straight line is drawn according to a least-square method in which the x-axis indicates the measurement angle and the y-axis indicates the change rate, the slope of the approximate straight line is −2.00 or more and −0.90 or less.

[3] A method for producing a decorative molded article, for which the following steps (1) and (2) are carried out in that order:
(1) A step of preparing a laminate by airtightly adhering a transfer sheet of the above [1] to an adherend, on the protective layer side based on the release sheet thereof;
(2) A step of separating the release sheet of the transfer sheet from the laminate. [4] A display device having a decorative molded article of the above [1] on the front surface of a display element.

Advantageous Effects of Invention

A decorative molded article and a display device using the decorative molded article of the present invention can secure a uniform brightness and can prevent whitening. In addition, according to a transfer sheet and a method for producing a decorative molded article of the present invention, a decorative molded article having the above-mentioned advantageous effects can be produced in a simplified manner.

BRIEF DESCRIPTION OF DRAWINGS

FIG. 1 is a cross-sectional view showing one embodiment of a decorative molded article of the present invention.

FIG. 2 is a graph showing a luminous reflectance distribution in a range of ±5.0 degrees of the decorative molded articles of Example 7 and Comparative Example 2.

FIG. 3 is a graph showing a luminous reflectance change rate distribution at each measurement angle of −5.0 degrees to +4.8 degrees of the decorative molded article of Example 7.

FIG. 4 is a graph showing a luminous reflectance change rate distribution at each measurement angle of −5.0 degrees to +4.8 degrees of the decorative molded article of Comparative Example 2.

FIG. 5 is a view for explaining a measurement method for a luminous reflectance of a decorative molded article.

FIG. 6 is a cross-sectional view showing one embodiment of a transfer sheet of the present invention.

FIG. 7 is a cross-sectional view showing one embodiment of a production process for a decorative molded article of the present invention.

DESCRIPTION OF EMBODIMENTS

[Decorative Molded Article]

The decorative molded article of the present invention is provided with a protective layer having an uneven surface on an adherend, and satisfying the following requirement 1-1:

<Requirement 1-1>

A black plate is stuck to the surface of the article on the adherend side thereof via a transparent pressure-sensitive adhesive layer to prepare a sample A. A visible light inclined by 10 degrees from the normal direction of the sample A is made to run into the uneven surface, and based on the specular direction of the incident light as a reference angle, a luminous reflectance is measured every 0.2 degrees within a range of the reference angle±5.0 degrees. When the luminous reflectance at −5.0 degrees relative to the reference angle is represented by $Y_{-5.0}$ and the luminous reflectance at −4.8 degrees is represented by $Y_{-4.8}$, a value represented by an expression of $[Y_{-4.8}-Y_{-5.0})/((Y_{-4.8}+Y_{-5.0}/2)]\times 100$ is defined as a change rate of the luminous reflectance at −5.0 degrees. When a change rate of the luminous reflectance at every measurement angle in a range of −5.0 degrees to +4.8 degrees is calculated according to the expression and an approximate straight line is drawn according to a least-square method in which the x-axis indicates the measurement angle and the y-axis indicates the change rate, the slope of the approximate straight line is −2.00 or more and −0.90 or less.

FIG. 1 is a cross-sectional view showing one embodiment of a decorative molded article of the present invention. The decorative molded article 100 of FIG. 1 is provided with a protective layer 21 having an uneven surface on an adherend 10.

In FIG. 1, an adhesive layer 22 is arranged between the adherend 10 ad the protective layer 21, and the surface of the protective layer has a region P having an uneven surface and a region Q adjacent to the region P.

<<Requirement 1-1>>

The requirement 1-1 requires that the slope of the approximate straight line as calculated in the manner as above is −2.00 or more and −0.90 or less. First, the technical meaning of the requirement 1-1 is described.

FIG. 2 is a graph showing a luminous reflectance distribution in a range of ±5.0 degrees of the decorative molded articles of Example 7 and Comparative Example 2. The solid line indicates the luminous reflectance of Example 7, and the dashed line indicates the luminous reflectance of Comparative Example 2. From comparison between Example 7 (solid line) and Comparative Example 2 (dashed line), it is confirmed that the luminous reflectance of the decorative molded article of Example 7 gently changes as compared with that of decorative molded article of Comparative Example 2.

Next, FIG. 3 is a graph showing a luminous reflectance change rate distribution at each measurement angle of −5.0 degrees to +4.8 degrees of the decorative molded article of Example 7. The slope of the approximate straight line drawn from the distribution in FIG. 3 according to a least-square method is "−1.81".

On the other hand, FIG. 4 is a graph showing a luminous reflectance change rate distribution at each measurement angle of −5.0 degrees to +4.8 degrees of the decorative molded article of Comparative Example 2. The slope of the approximate straight line drawn from the distribution in FIG. 4 according to a least-square method is "−2.82".

The slope of the approximate straight lines calculated from the distributions in FIG. 3 and FIG. 4 correlates with the discussion on FIG. 2 mentioned above. Namely, the slope of the approximate straight line of FIG. 3 (Example 7) is smaller than the slope of the approximate straight line of FIG. 4 (Comparative Example 2), and therefore it is known that the degree of the slope of the approximate straight line indicates the degree of a luminous reflectance change rate in a range of ±5.0 degrees.

Consequently, the slope of the approximate straight line of −2.00 or more means that the luminous reflectance change rate in a range of ±5.0 degrees is small. With that, since "transmittance≈(is nearly equal to) 100−luminous reflectance", a small luminous reflectance change rate of a decorative molded article means that the transmittance change rate of the decorative molded article is small. Consequently, by controlling the slope of the approximate straight line to be −2.00 or more, it is possible to reduce the change rate of a reflected light and a transmitted light from and through a decorative molded article to thereby equalize the brightness at the center of the visual field of the decorative molded article.

As described above, when the slope of the approximate straight line is controlled to be −2.00 or more, the brightness at the center of the visual field of a decorative molded article can be equalized.

On the other hand, a slope of the approximate straight line that comes close to 0 means that the luminous reflectance distribution in a range of ±5.0 degrees in FIG. 2 comes close to a semicircular (≈that the surface reflection from the decorative molded article is diffusive reflection uniformly in all directions). In other words, a slope of the approximate straight line that comes close to 0 means that the surface diffusion from a decorative molded article is strong.

Accordingly, by controlling a slope of the approximate straight line to be −0.90 or less, it is possible to prevent surface diffusion from a decorative molded article and to prevent whitening thereof.

Preferably, the slope of the approximate straight line is −1.80 to −1.00, more preferably −1.50 to −1.10.

In this description, "AA to BB" means "AA or more and BB or less".

FIG. 5 is a view for explaining a measurement method for a luminous reflectance of the decorative molded article 100.

For measuring the luminous reflectance of the decorative molded article 100, first, a black plate 400 is stuck to the surface on the side of an adherend of the decorative molded article 100, via a transparent pressure-sensitive adhesive layer 300 to prepare a sample A (500). Next, a visible light inclined by 10 degrees from the normal direction of the sample A (500) is made to run through the uneven surface. The direction of a dashed line in FIG. 5 is a normal direction, and the solid line indicates an incident light. Based on the specular direction of the incident light as a reference angle, a luminous reflectance is measured every 0.2 degrees within a range of the reference angle±5.0 degrees. The dashed line in FIG. 5 corresponds to the specular direction of the incident light (reference angle).

Regarding the refractive index of the transparent pressure-sensitive adhesive layer 300 for use in the sample A and the sample B to be mentioned below, the refractive index difference between the refractive index of the adherend 10 and that of the black plate 300 is 0.05 or less, and preferably the refractive index difference is 0.00. In this description, the refractive index means a refractive index at a wavelength of 589 nm.

In this description, the luminous reflectance is a Y value in the XYZ color system of CIE1931.

In this description, the slope of the approximate straight line in the requirement 1-1 is an average value of measured data at 10 sites. The same shall apply also to the requirements 1-2, 1-3, 1-4, 1-5 and 1-6, and the requirements 2-1 to 2-6.

<<Other Requirements>>

Preferably, the decorative molded article (sample A formed of a decorative molded article) further satisfies any one or more of the following requirements 1-2 to 1-6.

<Requirement 1-2>

In a range of the reference angle±5.0 degrees, an absolute value of a difference between a value of the luminous reflectance calculated from the approximate straight line and a measured value of the luminous reflectance at each measurement angle is calculated with respect to each measurement angle. A standard deviation of the absolute value of the difference calculated in the range±5.0 degrees is 0.50 to 1.60%.

The standard deviation of the absolute value of the difference in the requirement 1-2 indicates that the angle distribution of the uneven surface has a predetermined randomness. By controlling the standard deviation of the absolute value of the difference to be 0.50% or more, defects such as faults, if forming on the uneven surface, can be de-emphasized thereon. By controlling the standard deviation of the absolute value of the difference to be 1.60% or less, sparkle can hardly occur. "Sparkle" means a phenomenon of fine brightness fluctuation to occur in projected images owing to uneven structures.

In the requirement 1-2, the standard deviation of the absolute value of the difference is more preferably 0.60 to 1.40%, even more preferably 0.70 to 1.20%.

<Requirement 1-3>

When the angle that indicates a ½ luminous reflectance of the luminous reflectance at the reference angle is represented by $\alpha$, an average of the absolute value of $\alpha$ is 2.5 to 5.0 degrees.

A calculation method for $\alpha$ is described with reference to FIG. 2 as an example.

The solid line in FIG. 2 is a graph showing a luminous reflectance distribution of the decorative molded article of Example 7. The luminous reflectance at the reference angle (0 degree) in FIG. 2 is 1.48%, and a value of ½ thereof is 0.74%. With that, the angle ($\alpha$) at which the luminous reflectance is 0.74% is calculated in the plus direction and the minus direction, and an absolute value of $\alpha$ in the plus direction and an absolute value of $\alpha$ in the minus direction are averaged to calculate an average of the absolute value of $\alpha$ in the requirement 1-2. In the case of the solid line in FIG. 2, $\alpha$ in the plus direction is +3.6 degrees, and $\alpha$ in the minus direction is −3.6 degrees, and an average of the absolute values thereof is 3.6 degrees.

$\alpha$ indicates a range where, among the light having run into and reflected from the uneven surface of the decorative molded article, a low-frequency light having diffused and reflected owing to the surface unevenness has spread. More specifically, $\alpha$ indicates a range where a reflected light in small diffusion has spread.

Accordingly, the fact satisfying the requirement 1-3 means that a certain amount of small diffusion of low frequency owing to surface unevenness is contained, and means that such small diffusion is not too small or too large.

The upper limit of $\alpha$ is, from the viewpoint of preventing the contrast from lowering owing to excessive existence of unevenness of low-frequency components, preferably 4.8 degree or less, more preferably 4.6 degree or less. The lower limit of $\alpha$ is, from the viewpoint of imparting anti-glare performance owing to unevenness of low frequency, preferably 3.0 degrees or more, more preferably 3.5 degrees or more.

Further, the decorative molded article preferably satisfies the following requirement 1-4.

<Requirement 1-4>

The luminous reflectance $Y_0$ at the reference angle is 2.0% or less.

By controlling the luminous reflectance to be 2.0% or less, anti-glare performance can be bettered. The luminous reflectance $Y_0$ is more preferably 1.7% or less, even more preferably 1.5% or less, further more preferably 1.3% or less. The lower limit of the luminous reflectance $Y_0$ is not specifically limited, but when the luminous reflectance $Y_0$ is too low, the decorative molded article tends to whiten, and therefore, the lower limit is preferably 0.5% or more, more preferably 0.7% or more.

Preferably, the decorative molded article has, in the surface of the protective layer, a region P having the above-mentioned uneven surface, and a region Q adjacent to the region P. When the surface of the protective layer has different regions, the design decorativeness of the decorative molded article can be bettered.

The configuration of the region P and the region Q may be any arbitrary one. Examples thereof include a configuration of arranging a region P in the center part of the surface of a protective layer and arranging a region Q in the peripheral part thereof a configuration of arranging a region Q in the center part of the surface of a protective layer and arranging a region P in the peripheral part thereof; a configuration of arranging a region P and a region Q in parallel to each other; a configuration of arranging plural independent regions P around the center of the surface of a protective layer and arranging a region Q around the plural regions P; and a configuration of arranging plural independent regions Q around the center of the surface of a protective layer and arranging a region P around the plural regions Q.

The surface of the protective layer may have any other region.

In the decorative molded article, preferably, the region P and the region Q satisfy the following requirement 1-5.
<Requirement 1-5>

A visible light inclined by 10 degrees from the normal direction of the sample A is made to run through the surface in the region P and the region Q of the sample A, and based on the specular direction of the incident light as a reference angle, the luminous reflectance is measured every 0.2 degrees in a range of the reference angle±5.0 degrees. When the luminous reflectance at the reference angle in the region P is represented by $Y_{0P}$ and the luminous reflectance at the reference angle in the region Q is represented by $Y_{0Q}$, $Y_{0Q}-Y_{0P}$ is 1.5% or more.

Satisfying the requirement 1-5, the region P and the region Q can be readily differentiated and the design decorativeness of the decorative molded article can be thereby bettered.

More preferably, $Y_{0Q}-Y_{0P}$ is 2.0% or more, even more preferably 2.5% or more. The upper limit of $Y_{0Q}-Y_{0P}$ is not specifically limited, but is preferably 4.5% or less, more preferably 3.5% or less.

Preferably, the region P and the region Q in the decorative molded article satisfy the following requirement 1-6.
<Requirement 1-6>

A visible light inclined by 10 degrees from the normal direction of the sample A is made to run into the surface of the region P and the region Q of the sample A, and a luminous reflectance is measured every 0.2 degrees within a range of the reference angle±5.0 degrees. When the angle that indicates a ½ luminous reflectance of the luminous reflectance at the reference angle in the region P is represented by $\alpha_P$, and when the angle that indicates a ½ luminous reflectance of the luminous reflectance at the reference angle in the region Q is represented by $\alpha_Q$, [average of an absolute value of $\alpha_P$]−[average of an absolute value of $\alpha_Q$] is 2.5 degrees or more.

Satisfying the requirement 1-6, the region P and the region Q can be readily differentiated and the design decorativeness of the decorative molded article can be thereby bettered.

More preferably, [average of an absolute value of $\alpha_P$]−[average of an absolute value of $\alpha_Q$] is 3.0 degrees or more, even more preferably 3.5 degrees or more. The upper limit of [average of an absolute value of $\alpha_P$]−[average of an absolute value of $\alpha_Q$] is preferably less than 5.0 degrees, more preferably less than 4.8 degrees, even more preferably less than 4.6 degrees.

For more readily satisfying the requirement 1-5 and the requirement 1-6, preferably, the region Q is substantially smooth. Specifically, the arithmetic average roughness Ra according to JIS B0601:1994 of the region Q is preferably less than 0.10 µm, more preferably 0.05 µm or less. On the other hand, Ra of the region P is preferably more than 0.10 µm and 0.30 µm or less, even more preferably 0.15 to 0.25 µm.

Varying in relation to the design to be given to the decorative molded article, the ratio of the area $S_2$ of the region Q to the area $S_1$ of the region P [$S_2/S_1$] is not specifically limited, but from the viewpoint of clarifying the contrast between the region P and the region Q, the ratio preferably satisfies a relation of $0.1 \leq S_2/S_1$. Also from the viewpoint of bettering the anti-glare performance of the decorative molded article, the ratio preferably satisfies a relation of $S_2/S_1 \leq 7.0$.

<<Other Optical Properties>>

The total light transmittance according to JIS K7361-1:1997 of the area (region P) having an uneven surface of the decorative molded article is preferably 80% or more, more preferably 90% or more.

In the case where the decorative molded article has a region P having an uneven surface and a region Q adjacent to the region P, the total light transmittance of the region Q is not specifically limited. Namely, the region Q may substantially have light shieldability, or may have light permeability.

The haze according to JIS K7136:2000 of the area (region P) having an uneven surface of the decorative molded article is preferably 5 to 40%, more preferably 10 to 35%, even more preferably 20 to 30%.

In the case where the decorative molded article has a region P having an uneven surface and a region Q adjacent to the region P, the haze of the region Q is not specifically limited. Namely, the region Q may substantially have light shieldability and its haze is therefore undetectable, or may have a predetermined haze.

Preferably, the decorative molded article has, on the surface of a protective layer, a first region having an uneven surface, a second region adjacent to the first region, and a third region adjacent to the second region, and is such that the 60-degree specular gloss, as measured according to JIS Z8741:1997, of the first region $Gs_1(60°)$ is smaller than the 60-degree specular gloss, as measured according to JIS Z8741:1997, of the third region $Gs_3(60°)$, and the 60-degree specular gloss, as measured according to JIS Z8741:1997, of the second region) $Gs_2(60°)$ progressively increases within a range of $Gs_1(60°)$ or more and $Gs_3(60°)$ or less from the first region side toward the third region side.

The 60-degree specular gloss of the decorative molded article is preferably measured by forming the above-mentioned sample A.

In the second region, when the gloss level varies as described above, the interface between the matted first region 1 and the glossy third region can be kept seamless and the design decorativeness of the decorative molded article can be thereby bettered.

Some decorative molded articles may be colored or patterned in any desired sites (for example, in the surface opposite to the protective layer of the adherend). In such decorative molded articles, these colors or patterns may give some different impressions at the edges of the first region depending on the time when the decorative molded articles are seen at the front thereof or in oblique directions. However, by varying the gloss level in the second region as above, the above-mentioned impression difference at the edges of the first region can be relieved. In the case where only the part corresponding to the third region of the decorative molded article is colored or patterned, the above-mentioned effect can be more remarkably expressed.

Preferably, a ratio of $Gs_1(60°)$ to $Gs_3(60°)$ [$Gs_1(60°)/Gs_3(60°)$] is 0.6 or less more preferably 0.55 or less, even more preferably 0.45 or less.

$Gs_1(60°)$ is, from the viewpoint of securing a sufficient matted feel, preferably 100% or less. However, from the viewpoint of preventing a whitening impression when it is too small, $Gs_1(60°)$ is preferably 30% or more, more preferably 40 to 90%, even more preferably 50 to 80%.

The degree of gradual increase in the 60-degree specular gloss may be proportional to the distance from the first region, or the increase ratio relative to the distance may vary on the way. From the viewpoint of preventing the second region from being visualized as a clear line, preferably, the increase ratio is small at around the first region and around the third region, and the gloss level gradually increases so as to have a flexion point at around the intermediate between the two regions.

The difference in the 60-degree specular gloss in each region can be controlled by controlling the difference in the surface unevenness in each region.

The width $d_2$ of the second region is appropriately defined depending on the decoration in the first region and the third region, but is preferably such that the gloss gradient between the first region and the third region is not clearly visualized in the second region. From this viewpoint, $d_2$ is preferably 0.1 to 2.0% of the greatest dimension L of the decorative film, more preferably 0.1 to 1.5%, even more preferably 0.1 to 1.0%.

<<Protective Layer>>

Preferably, the protective layer contains a cured product of a curable resin composition as a main component thereof. The main component means a component that accounts for 50% by mass or more of the total solid content constituting the protective layer, and the proportion is preferably 70% by mass or more, more preferably 80% by mass or more, even more preferably 90% by mass or more.

A cured product of a curable resin composition includes a cured product of a thermosetting resin composition, and a cured product of an ionizing radiation-curable resin composition, and among these, a cured product of an ionizing radiation-curable resin composition is preferred.

The protective layer may contain a thermoplastic resin, but from the viewpoint of improving scratch resistance, the amount thereof is preferably minor. Specifically, the content of a thermoplastic resin in the protective layer is preferably less than 5% by mass, more preferably less than 1% by mass, even more preferably 0.1% by mass, further more preferably 0% by mass.

Hereinunder, a cured product of a curable resin composition and a thermoplastic resin may be referred to as "resin component".

A thermosetting resin composition is a composition containing at least a thermosetting resin, and this is a resin composition that cures by heating. The thermosetting resin includes an acrylic resin, a urethane resin, a phenolic resin, a urea-melamine resin, an epoxy resin, an unsaturated polyester resin, and a silicone resin. In the thermosetting resin composition, if desired, a curing agent is added to such a curable resin.

An ionizing radiation-curable resin composition is a composition containing a compound having an ionizing radiation-curable functional group (hereinafter also referred to as "ionizing radiation-curable compound"). The ionizing radiation-curable functional group includes an ethylenic unsaturated bond group such as a (meth)acryloyl group, a vinyl group and an allyl group, and an epoxy group, and an oxetanyl group.

The ionizing radiation-curable resin is preferably a compound having an ethylenic unsaturated bond group. From the viewpoint of preventing the resin layer from being scratched in a process of producing a transfer sheet, as the ionizing radiation-curable resin, a compound having two or more ethylenic unsaturated bond groups is preferred, and above all, a polyfunctional (meth)acrylate compound having two or more ethylenic unsaturated bond groups is more preferred. As the polyfunctional (meth)acrylate compound, any of a monomer and an oligomer is usable.

An ionizing radiation means one having an energy quantum capable of polymerizing or crosslinking molecules, among electromagnetic waves and charged particle radiations, and in general, ultraviolet ray (UV) or electron beam (EB) is used, and in addition, electromagnetic waves such as X ray and γ ray, and charged particle radiations such as α ray and ion beam are also usable.

Among polyfunctional (meth)acrylate compounds, a difunctional (meth)acrylate monomer includes ethylene glycol di(meth)acrylate, bisphenol A tetraethoxy diacrylate, bisphenol A tetrapropoxy diacrylate, and 1,6-hexanediol diacrylate.

Examples of a trifunctional or higher (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

A part of the molecular skeleton of the above-mentioned (meth)acrylate monomer may be modified, and those modified with any of ethylene oxide, propylene oxide, caprolactone, isocyanuric acid, alkyl, cyclic alkyl, aromatic or bisphenol are also usable.

The polyfunctional (meth)acrylate oligomer includes acrylate polymers such as urethane (meth)acrylate, epoxy (meth)acrylate, polyester (meth)acrylate, and polyether (meth)acrylate.

Urethane (meth)acrylate can be obtained by reaction of a polyalcohol and an organic diisocyanate and a hydroxy (meth)acrylate.

Preferred examples of epoxy (meth)acrylate include a (meth)acrylate obtained by reaction of a trifunctional or higher aromatic epoxy resin, an alicyclic epoxy resin, or an aliphatic epoxy resin and a (meth)acrylic acid; a (meth)acrylate obtained by reaction of a difunctional or higher aromatic epoxy resin, an alicyclic epoxy resin or an aliphatic epoxy resin and a polybasic acid and a (meth)acrylic acid, and a (meth)acrylate obtained by reaction of a difunctional or higher aromatic epoxy resin, an alicyclic epoxy resin or an aliphatic epoxy resin and a phenolic compound and a (meth)acrylic acid.

One alone or two or more kinds of the above-mentioned ionizing radiation-curable resins can be used either singly or as combined.

In the case where the ionizing radiation-curable resin is a UV-curable resin, preferably, the coating liquid for forming the resin layer contains an additive such as a photopolymerization initiator or a photopolymerization accelerator.

The photopolymerization initiator includes one or more selected from acetophenone, benzophenone, α-hydroxyalkylphenone, Michler ketone, benzoin, benzyldimethyl ketal, benzoyl benzoate, α-acyloxime ester, and thioxanthones.

The photopolymerization accelerator can reduce polymerization inhibition by air in curing to thereby accelerate a curing rate, and examples thereof include one or more selected from isoamyl p-dimethylaminobenzoate, and ethyl p-dimethylaminobenzoate.

The curable resin composition can be in a semi-cured state at the time of forming a protective layer and, after transferred to an adherend, the curable resin composition may be cured by heating or through irradiation with ionizing radiation in an accelerated manner for complete curing. In that manner, the followability of the protective layer to the adherend can be bettered and moldability can be thereby bettered.

The protective layer may contain particles such as organic particles and inorganic particles. Containing particles, the protective layer can be prevented from emphasizing sparkle or defects owing to expression of internal haze to result from refractive index difference from resin components. For the same purpose, such particles may also be contained in any other functional layer such as an adhesive layer or an anchor layer to be mentioned below. From the viewpoint of preventing cracking in molding, preferably, particles are contained in a functional layer rather than in the protective layer.

The organic particles include particles of polymethyl methacrylate, polyacryl-styrene copolymer, melamine resin, polycarbonate, polystyrene, polyvinyl chloride, benzoguanamine-melamine-formaldehyde condensate, silicone, fluororesin and polyester resin.

The inorganic particles include particles of silica, alumina, antimony, zirconia and titania.

The average particle size of the particles is preferably 0.05 to 5.0 µm, more preferably 0.5 to 3.0 µm.

In this description, the average particle size is a 50% particle size (d50: median diameter), for which particles in a solution are measured according to a dynamic light scattering method and the particle size distribution is expressed as a volume cumulative distribution. For example, the 50% particle size can be measured using a Microtrac particle sizer (available from Nikkiso Co., Ltd.).

The content of particles is, relative to 100 parts by mass of the resin component in the protective layer, preferably 0.1 to 20 parts by mass, more preferably 1 to 10 parts by mass.

When the content of particles is 0.1 parts by mass or more, defects can be hardly emphasized and sparkle can be readily prevented. When the content of particles is 20 parts by mass or less and in the case where the surface of the protective layer has plural regions, each region can be prevented from being hardly differentiated to thereby prevent reduction in design decorativeness.

The thickness of the protective layer is, from the viewpoint of the balance between surface hardness and moldability, preferably 0.5 to 30 µm, more preferably 1 to 20 µm, even more preferably 3 to 10 µm.

<<Adherend>>

The adherend may be a resin molded article of an injection-moldable thermoplastic resin or thermosetting resin.

In the case where the decorative molded article of the present invention is produced according to an in-mold process, a thermoplastic resin is preferably used. Such a thermoplastic resin includes a polystyrene resin, a polyolefin resin, an ABS resin (including a heat-resistant ABS resin), an AS resin, an AN resin, a polyphenylene oxide resin, a polycarbonate resin, a polyacetal resin, an acrylic resin, a polyethylene terephthalate resin, a polybutylene terephthalate resin, a polysulfone resin, and a polyphenylene sulfide resin.

<<Other Layers>>

The decorative molded article of the present invention may have any other functional layer such as an anchor layer, a print layer and an adhesive layer, between the adherend and the protective layer.

<<Adhesive Layer>>

The adhesive layer plays a role of bettering adhesiveness between the adherend such as a rein molded article and a transfer layer such as a protective layer to thereby better transferability.

In the case where the adhesiveness between the protective layer and the adherend is good, the adhesive layer may be omitted.

For the adhesive layer, a heat-sensitive or pressure-sensitive resin suitable to a material of the adherend is preferably used. For example, in the case where the material of the adherend is an acrylic resin, an acrylic resin is preferably used for the adhesive layer. In the case where the material of the adherend is a polyphenylene oxide-polystyrene resin, a polycarbonate resin or a styrene resin, preferably, an acrylic resin, a polystyrene resin or a polyamide resin having an affinity to those resins is used. In the case where the material of the adherend is a polypropylene resin, preferably, a chlorinated polyolefin resin, a chlorinated ethylene-vinyl acetate copolymer resin, a cyclic rubber or a chromane-indene resin is used.

An additive such as a UV absorbent or an IR absorbent may be added to the adhesive layer.

The thickness of the adhesive layer is preferably 0.1 to 10 µm, more preferably 0.5 to 5 µm.

<<Anchor Layer>>

The anchor layer is a layer optionally arranged for the purpose of improving heat resistance in a case of high-temperature environments such as in an in-mold process. Preferably, the anchor layer is formed between a protective layer and an adhesive layer.

Preferably, the anchor layer contains a cured product of a curable resin composition.

The curable resin composition includes a thermosetting resin composition and an ionizing radiation-curable resin composition.

Embodiments of the thermosetting resin composition and the ionizing radiation-curable resin composition of the anchor layer are the same as the embodiments of the thermosetting resin composition and the ionizing radiation-curable resin composition of the protective layer.

The thickness of the anchor layer is preferably 0.1 to 6 µm, more preferably 0.5 to 5 µm.

<<Print Layer>>

The print layer is a layer for imparting a desired design decorativeness to the decorative molded article, and is optionally arranged in the article.

The print layer may have any desired pattern, and examples thereof include grain, pebble, fabric, grey, circle, square, polygon, geometric design, letter, and solid printing patterns.

Preferably, the print layer contains a binder resin such as a polyvinyl resin, a polyester resin, an acrylic resin, a polyvinyl acetal resin or a cellulose resin, and a pigment and/or a dye.

The thickness of the print layer is, from the viewpoint of design decorativeness, preferably 0.5 to 40 µm, more preferably 1 to 30 µm.

The functional layer to be arranged between the adherend and the protective layer contains a binder resin and particles, and the refractive index $n_1$ of the binder resin preferably differs from the refractive index $n_2$ of the particles.

When particles are contained in the functional layer positioned on the more adherend side than the protective layer, defects such as cracks can be prevented from forming in molding. In the case where the functional layer is formed of plural layers, preferably, the functional layer on the most adherend side contains particles.

When a transfer layer is transferred to the adherend, the functional layer is positioned lower than the protective layer. Consequently, in the configuration containing particles in the functional layer, the internally-diffused light can spread in a broader angle range until it reaches the surface of the protective layer, as compared with the configuration containing particles in the protective layer, and therefore the defects having formed on the surface of the protective layer can be prevented from being emphasized and sparkle can also be prevented. Further, the configuration containing particles in the functional layer is more advantageous in that the above-mentioned effects (invisibilization of defects, sparkle prevention) can be more readily realized even though the content of the particles is small, as compared with the configuration containing particles in the protective layer.

Regarding the ratio of the refractive index $n_1$ of the binder resin to the refractive index $n_2$ of the particles, preferably $n_2/n_1$ is 0.98 or less, or 1.02 or more.

From the viewpoint of enhancing the internal haze (internal diffusion) so as not to make defects and sparkle emphasized, $n_2/n_1$ is more preferably 0.98 or less. $n_2/n_1$ of 0.98 or less is preferred since the amount of particles to be added for attaining the same level of an internal haze (internal diffusion) can be reduced in the case.

$n_2/n_1$ of 0.98 or less or 1.02 or more is also preferred since interference fringes can be prevented from forming in the case.

Embodiments of the kind, the average particle size and the amount of the particles to be added to the functional layer are the same as the embodiments of the kind, the average particle size and the amount of the particles to be added to the protective layer.

Preferably, the decorative molded article has particles in at least a part of the interface between the functional layer positioned on the most adherend side (functional layer in contact with the adherend) and the adherend, and when the refractive index of the binder resin in the functional layer in contact with the adherend is represented by $n_1$, the refractive index of the particles is represented by $n_2$ and the refractive index of the resin in the adherend is represented by $n_3$, preferably these satisfy the following requirement (i) or (ii).

$$n_1 < n_2 < n_3 \quad \text{(i)}$$

$$n_3 < n_2 < n_1 \quad \text{(ii)}$$

The requirement (i) and the requirement (ii) mean that the refractive index $n_1$ of the binder resin (resin 1) in the functional layer in contact with the adherend differs from the refractive index $n_3$ of the resin (resin 3) in the adherend. To that effect, in the case where the refractive index of the resin 1 differs from that of the resin 3, in general, interference fringes are formed in a decorative molded article.

However, when the requirement (i) or (ii) is satisfied, an internal haze is formed owing to the refractive index difference between the particles positioned in the interface between the functional layer in contact with an adherend and the adherend (hereinafter also referred to as "interfacial particles") and the resin 1 and the resin 3 to prevent interference fringes. Further, the formed internal haze can make the defects of a decorative molded article inconspicuous and can therefore increase production yield.

In a decorative molded article satisfying the requirement (i) or (ii), the refractive index $n_2$ of the interfacial particles is more than $n_1$ and less than $n_3$, or more than $n_3$ and less than $n_1$, and therefore, reflection owing to the refractive index difference between the resin 1 and the resin 3 can be prevented and whitening owing to reflection can thereby be prevented.

In the case of satisfying the requirement (i), preferably, $n_2/n_1$ is more than 1.00 and 1.03 or less, and $n_2/n_3$ is 0.97 or more and less than 1.00, more preferably $n_2/n_1$ is 1.01 or more and 1.03 or less, and $n_2/n_3$ is 0.97 or more and 0.99 or less.

In the case of satisfying the requirement (ii), preferably, $n_2/n_1$ is 0.97 or more and less than 1.00, and $n_2/n_3$ is more than 1.00 and 1.03 or less, more preferably $n_2/n_1$ is 0.97 or more and 0.99 or less, and $n_2/n_3$ is 1.01 or more and 0.03 or less.

Regarding the requirement (i) or the requirement (ii), when the above-mentioned preferred requirements are satisfied, well-balanced inhibition of interference fringes and whitening can be bettered more.

Particles can be made to exist in at least a part of the interface between the functional layer in contact with the adherend and the adherend by (a) previously incorporating particles in the adherend and/or by (b) previously incorporating particles in the functional layer in contact with the adherend. In the above-mentioned embodiments, particles can be readily made to exist at least in a part of the interface between the adherend and the functional layer, and the embodiment (b) in which the amount of the particles to be used can be readily controlled is preferred.

In the case of the above-mentioned embodiments (a) and/or (b), the content of the particles is preferably 0.1 to 20% by mass of the total solid content in the layer containing the particles, more preferably 0.5 to 15% by mass, even more preferably 1 to 10% by mass.

Embodiments of the kind and the average particle size of the interfacial particles are the same as the embodiments of the kind and the average particle size of the particles to be added to the protective layer.

However, in the case of the embodiment (b), the thickness T of the functional layer in contact with the adherend and the average particle size D of the particles in the interface preferably satisfy a relation of $1.0 < D/T$. $D/T$ is more preferably 1.1 or more and 2.0 or less, even more preferably 1.3 or more and 1.7 or less.

Each of the protective layer, the adhesive layer, the anchor layer and the print layer constituting the transfer layer can be formed, for example, by preparing a coating liquid containing the constituent components of each layer, applying the coating liquid onto a release sheet according to a coating method of a gravure coating method or a roll coating method, or a printing method of a gravure printing method or a screen printing method, then drying it and optionally irradiating it with an ionizing radiation to cure the layer.

The decorative molded article of the present invention can be favorably used, for example, as members constituting communication devices such as mobile phones, in-car information devices, household electric appliances, and various display devices.

[Transfer Sheet]

The transfer sheet of the present invention has a protective layer on a release sheet, in which at least a part of the surface on the side kept in contact with the protective layer of the release sheet has an uneven surface, and which satisfy the following requirement 2-1.

<Requirement 2-1>

The transfer sheet is stuck to a black plate via a transparent pressure-sensitive adhesive layer on the surface of the protective layer side of the transfer sheet, and then the release sheet is released to prepare a sample B having, in that order, the black plate, the transparent pressure-sensitive adhesive layer and the protective layer provided with a surface profile complementary to the surface profile of the transfer sheet. A visible light inclined by 10 degrees from the normal direction of the sample B is made to run into the uneven surface of the protective layer, and based on the specular direction of the incident light as a reference angle, a luminous reflectance is measured every 0.2 degrees within a range of the reference angle±5.0 degrees. When the luminous reflectance at −5.0 degrees relative to the reference angle is represented by $Y_{-5.0}$ and the luminous reflectance at −4.8 degrees is represented by $Y_{-4.8}$, a value represented by an expression of $[Y_{-4.8}-Y_{-5.0})/((Y_{-4.8}+Y_{-5.0}/2)]\times 100$ is defined as a change rate of the luminous reflectance at −5.0 degrees. When a change rate of the luminous reflectance at every measurement angle is calculated and when an approximate straight line is drawn according to a least-square method in which the x-axis indicates the measurement angle and the y-axis indicates the change rate, the slope of the approximate straight line is −2.00 or more and −0.90 or less.

FIG. 6 is a cross-sectional view showing one embodiment of a transfer sheet 200 of the present invention. The transfer sheet 200 of FIG. 6 has a protective layer 21 on a release sheet 30. The transfer sheet 200 of FIG. 6 has a region P' having an uneven surface and a region Q' adjacent to the region P', in the surface on the side in contact with the protective layer 21 of the release sheet 30.

The profile of the surface on the side in contact with the protective layer 21 of the release sheet 30 of the transfer sheet 200 is a profile complementary to the surface profile of the above-mentioned decorative molded article. Namely, the profile of the region P' in FIG. 6 is complementary to the profile of the region P in FIG. 6. Also the profile of the region Q' in FIG. 6 is complementary to the profile of the region Q in FIG. 1.

A technical meaning of the slope of the approximate straight line in the requirement 2-1 is the same as that in the requirement 1-1. Namely, by controlling the slope of the approximate straight line in the requirement 2-1 to be −2.00 or more, the brightness in the center of the visual field of the decorative molded article produced using the transfer sheet of the present invention can be made uniform. By controlling the slope of the approximate straight line in the requirement 2-1 to be −0.90 or less, the surface diffusion of the decorative molded article formed using the transfer sheet of the present invention can be prevented and whitening thereof can be thereby prevented.

The slope of the approximate straight light in the requirement 2-1 is preferably −1.80 to −1.00, more preferably −1.50 to −1.10.

<<Other Requirements>>

Preferably, the sample B formed of the transfer sheet further satisfies any one or more of the following requirements 2-2 to 2-6.

The technical meanings of the requirements 2-2 to 2-6 are the same as those of the requirements 1-2 to 1-6.

Preferred embodiments of the requirements 2-2 to 2-6 are also the same as those of the requirements 1-2 to 1-6.

<Requirement 2-2>

In a range of the reference angle±5.0 degrees, an absolute value of a difference between a value of the luminous reflectance calculated from the approximate straight line and a measured value of the luminous reflectance at each measurement angle is calculated with respect to each measurement angle. A standard deviation of the absolute value of the difference calculated in the range±5.0 degrees is 0.50 to 1.60%.

<Requirement 2-3>

When the angle that indicates a ½ luminous reflectance of the luminous reflectance at the reference angle is represented by α, an average of the absolute value of α is 2.5 to 5.0 degrees.

<Requirement 2-4>

The luminous reflectance $Y_0$ at the reference angle is 2.0% or less.

Preferably, the transfer sheet 200 has a region P' having an uneven surface and a region Q' adjacent to the region P', in the surface on the side in contact with the protective layer 21 of the release sheet 30 (FIG. 6). Having different region in the surface on the side in contact with the protective layer of the release sheet, the design decorativeness of the decorative molded article formed using the transfer sheet can be bettered.

Preferably, the region P' and the region Q' in the transfer sheet satisfy the following requirement 2-5.

<Requirement 2-5>

A visible light inclined by 10 degrees from the normal direction of the sample B is made to run through the surface in the region P' and the region Q' of the sample B, and based on the specular direction of the incident light as a reference angle, the luminous reflectance is measured every 0.2 degrees in a range of the reference angle±5.0 degrees. When the luminous reflectance at the reference angle in the region P' is represented by $Y_{0P}$ and the luminous reflectance at the reference angle in the region Q' is represented by $Y_{0Q}$, $Y_{0Q}-Y_{0P}$ is 1.5% or more.

Preferably, the region P' and the region Q' in the transfer sheet satisfy the following requirement 2-6.

<Requirement 2-6>

A visible light inclined by 10 degrees from the normal direction of the sample B is made to run into the surface of the region P' and the region Q' of the sample B, and a luminous reflectance is measured every 0.2 degrees within a range of the reference angle±5.0 degrees. When the angle that indicates a ½ luminous reflectance of the luminous reflectance at the reference angle in the region P' is represented by $\alpha_P$, and when the angle that indicates a ½ luminous reflectance of the luminous reflectance at the reference angle in the region Q' is represented by $\alpha_Q$, [average of an absolute value of $\alpha_P$]−[average of an absolute value of $\alpha_Q$] is 2.5 degrees or more.

As described above, the surface on the side in contact with the protective layer of the release sheet has the region P' having an uneven surface and the region Q' adjacent to the region P'.

The release sheet is preferably such that the arithmetic mean roughness $Ra_1$ at a cutoff value of 0.8 mm of the region P', as measured according to JIS B0601:1994, and the arithmetic mean roughness $Ra_2$ at a cutoff value of 0.8 mm of the region Q', as measured according to JIS B0601:1994, satisfy a relation of $Ra_1>Ra_2$.

After the transfer layer is transferred to an adherend, the profile of the surface of the transfer layer has a profile complementary to the surface profile of the release sheet. Namely, the surface profile of the region P' and the region Q' of the release sheet corresponds to the surface profile formed on the surface of the adherend.

Accordingly, satisfying the relation of $Ra_1>Ra_2$ means that two regions each having a different surface profile can be formed in the adherend. With that, satisfying the relation of $Ra_1>Ra_2$ and having two regions each having a different profile, the design decorativeness of the adherend can be thereby bettered.

$Ra_1-Ra_2$ is preferably 0.05 to 1.00 μm, more preferably 0.07 to 0.80 μm, even more preferably 0.12 to 0.30 μm.

$Ra_1$ is preferably 0.06 to 1.20 μm, more preferably 0.10 to 1.00 μm, even more preferably 0.13 to 0.50 μm, further more preferably 0.15 to 0.35 μm.

$Ra_2$ is preferably less than 0.10 μm, more preferably 0.07 μm or less, even more preferably 0.05 μm or less.

Also preferably, the release sheet is such that the 10-point mean roughness $Rz_1$ at a cutoff value of 0.8 mm of the region P', as measured according to JIS B0601:1994, and the above-mentioned $Ra_1$ satisfy a relation of $2.0 \leq Rz_1/Ra_1 \leq 15.0$.

When $Rz_1/Ra_1$ is 15.0 or less, a difference between the peel strength of the region P' and the peel strength of the region Q' is prevented from increasing, and streaky patterns can be prevented from forming in releasing the release sheet.

When $Rz_1/Ra_1$ is 2.0 or more, certain randomness can be given to the unevenness of the region P' and therefore defects inside the region P can be thereby prevented from being emphasized after transfer. In addition, since defects are inconspicuous, the design decorativeness and the production yield of the resultant decorative molded article can be prevented from lowering.

$Rz_1/Ra_1$ is preferably 3.0 to 10.0, more preferably 3.5 to 8.0, even more preferably 4.0 to 7.0.

$Rz_1$ is preferably 0.25 to 5.00 μm, more preferably 0.50 to 2.50 μm, even more preferably 1.00 to 2.00 μm.

In this description, Ra and Rz each are an average value of data measured in arbitrary 20 sites with neither defects nor abnormalities in sites corresponding to the region P' and the region Q', for which samples cut out of sites not visually having any abnormalities such as dust and flaws are prepared.

<<Release Sheet>>

The release sheet 30 is, for example, as shown in FIG. 6, composed of a support 31 and a resin layer 32. Needless-to-say, the release sheet may be a single layer of a support or a resin layer alone, or may have a configuration of three or more layers having any other layer than a support and a resin layer.

Though not shown, the release sheet preferably has a release layer as the outermost surface on the side in contact with the protective layer.

<<Support>>

The support includes a plastic film of a resin including a polyolefin resin such as polyethylene and polypropylene, a polyvinyl resin such as polyvinyl chloride, polyvinylidene chloride, polyvinyl alcohol, ethylene-vinyl acetate copolymer and ethylene-vinyl alcohol copolymer, a polyester resin such as polyethylene terephthalate, polyethylene naphthalate and polybutylene terephthalate, an acrylic resin such as polymethyl (meth)acrylate and polyethyl (meth)acrylate, a styrene resin such as polystyrene, and a polyamide resin typified by nylon 6 or nylon 66.

Among these plastic films, a biaxially-stretched polyester film is preferred as excellent in heat resistance and dimensional stability and excellent in positioning aptitude in transfer.

The thickness of the support is, from the viewpoint of moldability, profile followability and handleability, preferably 12 to 150 μm, more preferably 25 to 100 μm.

The surface of the support may be processed for physical treatment such as corona discharge treatment or oxidation treatment or may be coated with an anchor agent or a coating material called a primer, for the purpose of enhancing the adhesiveness thereof to resin layers and others.

In the case where the release sheet is a single layer of a support, the support surface may be configured using a plate having a surface profile of a protective layer.

<<Resin Layer>>

Preferably, the resin layer contains, as a main component thereof, a resin component such as a thermoplastic resin, a cured product of a thermosetting resin composition, or a cured product of an ionizing radiation-curable resin composition. The main component means 50% by mass or more of the total solid content constituting the resin layer, and the proportion is preferably 70% by mass or more, more preferably 90% by mass or more.

Among the above-mentioned resin components, a cured product of an ionizing radiation-curable resin composition is preferred, which is excellent in strength and which can impart a correct and accurate profile since the composition can cure instantaneously. From the viewpoint of readily securing the effect of an ionizing radiation-curable resin composition, preferably a cured product of an ionizing radiation-curable resin accounts for 70% by mass or more of all the resin components constituting the resin layer, more preferably 90% by mass or more, even more preferably 95% by mass or more, further more preferably 100% by mass.

The resin layer may be formed by applying a coating liquid that contains particles and a binder resin, but from the viewpoint of forming a correct and accurate profile, the layer is preferably formed by printing using a printing plate having a profile complementary to the surface profile of the intended resin layer. Details of the method of forming the resin layer using a printing plate are described below.

In the case where a resin layer is formed by coating, the particles contained in the coating liquid may not a little aggregate, and therefore various measures for satisfying the requirement 1-1 and others will be necessary, and such is unfavorable as complicating the coating process.

Embodiments of the thermosetting resin composition and the ionizing radiation-curable resin composition for the resin layer are the same as the embodiments of the thermosetting resin composition and the ionizing radiation-curable resin composition for the protective layer described hereinabove.

Though not specifically limited, the thickness of the resin layer is preferably 1 to 15 μm, more preferably 2 to 12 μm.

Preferably from the viewpoint of improving the releasability of the transfer layer from the release sheet, the resin layer does not substantially contain particles. Specifically, the content of particles in the resin layer is preferably less than 1% by mass, more preferably less than 0.1% by mass, even more preferably less than 0.01% by mass, and further more preferably 0% by mass.

The interface between the release sheet and the transfer layer is formed to be releasable when the transfer layer is adhered to a substance to be transferred.

For improving releasability, the release sheet preferably has a release layer in at least a part of the surface on the side in contact with the transfer layer. From the viewpoint of uniformizing the in-plane releasability of the transfer sheet, the release sheet preferably has a release layer on the entire surface on the side in contact with the transfer layer.

When a release layer is formed on the uneven surface of a release sheet, an uneven profile having a small content of a high-frequency component can be formed on the surface of an adherend, and therefore the resultant decorative molded article can be readily prevented from whitening and sparkle.

Preferably, the release layer is mainly formed of a resin.

The resin for the release layer is not specifically limited so far as it is a material having a predetermined coating film strength and has a low adhesion power to a transfer layer, and includes an ordinary thermoplastic resin, a cured product of a thermosetting resin composition and a cured product of an ionizing radiation-curable resin composition. Specifically, the resin includes a fluororesin, a silicone resin, an acrylic resin, a polyester resin, a polyolefin resin, a polystyrene resin, a polyurethane resin, a cellulosic resin, a vinyl chloride-vinyl acetate copolymer resin, and a nitrocellulose.

Among these, a cured product of a thermosetting resin composition is preferred, and a cured product of a thermosetting resin composition containing an acrylpolyol and an isocyanate is more preferred.

The release layer may further contain a release agent for improving releasability. The release agent includes waxes such a synthetic wax and a natural wax. The synthetic wax is preferably a polyolefin wax such as a polyethylene wax and a polypropylene wax.

The thickness of the release layer is preferably 0.1 to 5.0 μm, more preferably 0.2 to 1.5 μm, even more preferably 0.3 to 1.0 μm.

The thickness of the release layer is calculated as a mean value in measurement of at least 20 sites on a cross section picture, for example, cutting a central part of the release sheet vertically, then taking a picture of the cross section and measuring thickness of the cross section at intervals of 500 μm on the cross section picture.

The release sheet may have any other layer.

The other layer includes an antistatic layer. Having an antistatic layer, peeling charge can be prevented in peeling the release sheet and therefore transfer operation can be improved.

Preferably, the antistatic layer contains an antistatic agent such as an electroconductive antistatic agent and an ion-conductive antistatic agent, and a binder resin.

Preferably, the antistatic agent is formed on the surface opposite to the surface of the side in contact with the transfer layer of the release sheet.

Preferably, the surface resistivity of the antistatic layer is controlled to fall within a range of $1.0 \times 10^{-9}$ Ω/square to $1.0 \times 10^{-12}$ Ω/square.

An antistatic agent may be contained in any other layer such as a resin layer to make the layer exhibit antistatic performance.

<<Production Method for Release Sheet>>

The release sheet can be produced, for example, according to the following steps (A1) to (A2).

(A1) A step of applying a resin layer-forming coating liquid that contains an ionizing radiation-curable resin composition onto a support to form an ionizing radiation-curable resin composition-containing layer.

(A2) A step of forming an uncured resin layer using a plate having a profile complementary to the surface profile of the resin layer, and simultaneously irradiating the resin layer with an ionizing radiation to cure the formed resin layer.

In the case where the ionizing radiation-curable resin composition contains a solvent, preferably, the solvent is removed by drying in the step (A1).

In the case where the release sheet has a release layer, a step (A3) of forming a release layer on the resin layer is carried out after the step (A2).

In the case where the surface of the resin layer has two or more regions (for example, a region P' and a region Q'), a plate having a profile complementary to the surface profile of the resin layer that contains the two or more regions may be used as the plate in the step (A2).

The plate for use in the step (A2) can be prepared by engraving the surface of a cylinder to have a desired profile, for example, according to etching, sand blasting, cutting, laser processing or a combination of these. Also the plate can be prepared by first forming a male plate (plate having the same profile as that of the resin layer) according to laser engraving or photofabrication and then winding an inverted one thereof around the surface of a cylinder.

The surface of the plate for use in the step (A2) is preferably plated with nickel or chromium, and is more preferably processed for hard chromium plating.

Among the above-mentioned plate forming methods, sand blasting is preferred from the viewpoint that the requirement 1-1 can be readily controlled.

In sand blasting, uneven profiles can be controlled, for example, by controlling the material of cylinder surface, the particle size of abrasive agent, the form of abrasive agent, the material of abrasive agent, the collision frequency of abrasive agent onto cylinder, the distance between jet nozzle and cylinder, the diameter of jet nozzle, the angle of jet nozzle to object to be worked, the jetting pressure and the jetting frequency.

Among the above-mentioned controlling means, "collision frequency of abrasive agent onto cylinder" is most simple and effective for controlling the requirement 1-1. Specifically, when the number of collision times of an abrasive agent on a cylinder surface is small, the slope of the approximate straight line comes to be far from 0, and with the increase in the number of collision times of an abrasive agent on a cylinder surface, the slope of the approximate straight line tends to be near to 0. This is considered to be because by increasing the number of collision times of an abrasive agent, the surface unevenness could be gradually averaged. However, though the slope of the approximate straight line comes to be near to 0 by increasing the number of collision times, such is limitative, and the slope may be then gradually saturated. The number of collision times for averaging the surface unevenness varies depending on the conditions for sand blasting, and under the sand blasting conditions in Examples, preferably, the sand blasting treatment is carried out 3 to 8 times or so for one site on the cylinder surface.

When an abrasive agent having an amorphous form is used, it may diffuse in a broad angle and the luminous reflectance distribution may be near to be semicircular and, as a result, the slope of the approximate straight line tends to be near to 0.

On the other hand, when a hard material is used for the cylinder surface, the cylinder could hardly be cut deep and therefore the slope of the approximate curve tends to be near to 0.

When the particle size of the abrasive agent is large, the surface unevenness is averaged and the slope of the approximate curve tends to be near to 0.

Change in the distance between a jet nozzle and a cylinder and in the jetting pressure may have little influence on averaging the surface unevenness. Consequently, it is considered that the distance between a jet nozzle and a cylinder and the jetting pressure would not have any significant influence on the requirement 1-1.

The averaging degree of unevenness is also correlated with the requirement 1-2. Namely, when the averaging degree of unevenness is high, the standard deviation in the requirement 1-2 is low, but when the averaging degree of unevenness is low, the standard deviation in the requirement 1-2 is high.

An average of the absolute value of α in the requirement 1-3 can be controlled by the tilt angle in the uneven surface. For example, when the particle size of the abrasive agent is increased, α becomes small, but when the particle size of the abrasive agent is decreased, α tends to be large. When the form of the abrasive agent is amorphous, α tends to be large.

The luminous reflectance $Y_0$ in the requirement 1-4 can be controlled by the proportion of a nearly smooth region existing in the uneven surface. For example, by reducing the proportion of a smooth region, the luminous reflectance $Y_0$ tends to be low.

In the case where any other layer such as a release layer is formed on the resin layer, the surface unevenness of the release sheet can be relaxed more than the surface unevenness of the resin layer. Accordingly, in the case where any other layer is formed on the resin layer, the plate to be used in the step (A2) may be such that relaxation of the surface unevenness is taken into consideration.

The release sheet may also be produced, for example, according to the following steps (B1) to (B2).

(B1) A step of filling a resin layer-forming coating liquid into a plate having a profile complementary to the surface profile of a protective layer.

(B2) A step of transferring the resin layer-forming coating liquid filled in the plate, onto a support, and optionally drying and curing to form a resin layer.

From the viewpoint of forming a correct and accurate profile, the above-mentioned steps (A1) to (A2) are preferred.

A transfer layer is formed on the release sheet.

A transfer layer 20 is a layer to be transferred to an adherend, and for example, as shown in FIG. 6, the layer is formed to cover the entire surface of the release sheet 30. Also shown in FIG. 6, for example, the transfer layer 20 has a protective layer 21 and an adhesive layer 22 in that order from the side near to the release sheet 30.

Embodiments of the protective layer and the adhesive layer of the transfer sheet are the same as the embodiments of the protective layer and the adhesive layer of the decorative molded article mentioned above.

The transfer sheet may have a functional layer such as an anchor layer, a print layer and an adhesive layer. Embodiments of these functional layers are the same as the embodiments of the functional layer of the decorative molded article mentioned above.

[Production Method for Decorative Molded Article]

A production method for the decorative molded article of the present invention includes the following steps (1) and (2) to be carried out in that order.

(1) A step of preparing a laminate by airtightly adhering the surface on the side of the protective layer 21 based on the release sheet 30 of the transfer sheet 200 of the present invention mentioned above, to an adherend 10.

(2) A step of separating the release sheet 30 of the transfer sheet 200 from the laminate.

FIG. 7 is a cross-sectional view showing one embodiment of the above-mentioned steps (1) and (2).

For a concrete production step for a decorative molded article, a known transfer method is employable.

For example, (i) a method of preparing a laminate in which a surface on the protective layer side of a transfer sheet is airtightly adhered to a previously formed article to be transferred, and separating (peeling) the release sheet of the transfer sheet from the laminate; (ii) a method of preparing a laminate in which a surface on the protective layer side of a transfer sheet is airtightly adhered to a tabular article to be transferred, and separating (peeling) the release sheet of the transfer sheet from the laminate; and (iii) a method of preparing a laminate in which a surface on the protective layer side of a transfer sheet is integrated (airtightly adhered) with an article to be transferred while the article is formed by injection-molding, and separating (peeling) the release sheet of the transfer sheet from the laminate [in-mold process (simultaneous injection-molding and transfer decoration method)]. Among these, the in-mold process (simultaneous injection-molding and transfer decoration method) is preferred as producing a resin molded article having a complicated surface profile such as a three-dimensional curve surface profile in a mode of decorative molding operation.

One embodiment of the production method for the decorative molded article using the transfer sheet of the present invention according to an in-mold process includes the following steps:

(a) a step of arranging the surface on the protective layer side based on the release sheet of the transfer sheet toward the inside of the mold for in-mold molding, (b) a step of injecting a resin into the mold for in-mold molding, (c) a step of integrating (airtightly adhering) the resin with the surface on the protective layer side of the transfer sheet to give a laminate, (d) a step of taking out the laminate from the mold, and separating (peeling) the release sheet of the transfer sheet from the laminate.

By producing a decorative molded article according to the production process as above, a complicated design can be expressed on the surface of an adherend.

In the case where the protective layer is in a semi-cured state, preferably, it is irradiated with UV rays after the step (d) so that the protective layer is completely cured.

[Display Device]

The display device of the present invention has a decorative molded article of the present invention as above on the front surface of a display element.

The display element includes a liquid-crystal display element, an EL display element, a plasma display element, and an electronic paper element.

The display device of the present invention can uniformize brightness, and can prevent whitening, and therefore can extremely better visibility.

EXAMPLES

The present invention is described specifically with reference to Examples and Comparative Examples given hereinunder. However, the present invention is not restricted to the embodiments of those Examples.

1. Production of Printing Plate 1-1. Production of Printing Plate A

A cylinder having, on the surface thereof, a metal layer of hard copper having a thickness of 200 μm was prepared. Next, a part thereof except an area to be blasted was masked. Next, while the cylinder was rotated, the surface of the unmasked area of the cylinder was repeatedly sand-blasted under the following conditions until the surface unevenness could be averaged, thereby producing a printing plate A having, as arranged therein, an uneven region P' in the central part thereof and a nearly smooth region Q' in the peripheral part.

[Sand Blasting Condition]

Diameter of cylinder: 300 mm

Abrasive grains: glass beads having a mean grain size of 83 μm

Diameter of jetting nozzle: 9 mm

Angle of jetting nozzle to object to be processed: vertical

Distance between jetting nozzle and object to be processed: 400 mm

Jetting pressure: 0.20 MPa

Pump frequency: 90 Hz 1-2. Production of Printing Plates B to D

Printing plates B to D were produced in the same manner as that for the printing plate A except that the sand blasting conditions and the metal layer of the cylinder were changed as in Table 1.

TABLE 1

| | Metal Layer | | Sand-Blasting Conditions | | |
| --- | --- | --- | --- | --- | --- |
| | Material | Thickness (μm) | Kind of Abrasive Grains | Grain Size of Abrasive Grains (μm) | Jetting Pressure (MPa) |
| Plate A | hard copper | 200 | glass beads | 83 | 0.23 |
| Plate B | hard copper | 200 | glass beads | 83 | 0.26 |
| Plate C | Stainless steel | 200 | glass beads | 83 | 0.20 |
| Plate D | hard copper | 200 | amorphous iron powder | 90 | 0.23 |

2. Production of Transfer Sheet and Decorative Molded Article

Example 1

On the primer-treated surface of a polyethylene terephthalate film (support) having a thickness of 50 μm, a resin layer-forming coting liquid of the following formulation was applied and dried to form an uncured resin layer.
<Resin Layer-Forming Coating Liquid>

| Urethane acrylate | 60 parts by mass |
| --- | --- |
| Methyl ethyl ketone | 40 parts by mass |
| Silicone-based leveling agent | 0.5 parts by mass |

Next, using the plate A produced in the above "1-1", the uncured resin layer was formed and simultaneously irradiated with an ionizing radiation from the polyethylene terephthalate film side to cure the formed resin layer, thereby forming a resin layer having a thickness of 5.0 μm on the polyethylene terephthalate film.

Next, a release layer-forming coating liquid of the following formulation was applied entirely on the resin layer, then dried and cured to form a release layer, thereby giving a release sheet for use in Example 1. The release sheet was so configured that a region P' was arranged in the center part thereof and a region Q' was in the peripheral part. The thickness of the release layer was measured according to the method described in this description, and was 0.3 μm.
<Release Layer-Forming Coating Liquid>

| Acryl polyol | 70 parts by mass |
| --- | --- |
| Isocyanate | 25 parts by mass |
| Ethyl acetate | 161 parts by mass |
| Methyl isobutyl ketone | 56 parts by mass |

Next, on the release layer of the release sheet, a protective layer-forming coating liquid of the following formulation was applied so that the deposited amount thereof after dried could be 6.5 g/m² (6.0 μm) to form a coating layer, and then irradiated with a fusion UV lamp system at a transportation velocity of 20 m/min and under the condition of an output 40% to semicure the protective layer. The cumulative light quantity at this time was measured with an illuminometer available from Eye Graphics Co., Ltd. (trade name: UVPF-A1) and was 15 mJ/m². The refractive index of the protective layer was 1.52.

<Protective Layer-Forming Coating Liquid>

| Urethane acrylate-based UV-curable resin composition (solid content: 35% by mass, toluene/ethyl acetate mixed solvent) | 100 parts by mass |
| --- | --- |

Next, an anchor layer-forming coating liquid of the following formulation was applied onto the protective layer so that the deposited amount thereof after dried could be 3.0 g/m², and dried to form a coating layer, and then aged at 40° C. for 72 hours to cure it to form an anchor layer having a thickness of 2 μm. The refractive index of the anchor layer was 1.50.
<Anchor Layer-Forming Coating Liquid>

| Acryl polyol (solid content: 25% by mass) (toluene/ethyl acetate/methyl ethyl ketone mixed solvent) | 100 parts by mass |
| --- | --- |
| xane methylene diisocyanate (solid content: 75% by mass, solvent: ethyl acetate) | 10 parts by mass |

Next, on the anchor layer, an adhesive layer-forming coating liquid of the following formulation was applied so that the deposited amount thereof after dried could be 2.5 g/m² to form a coating layer. The coating layer was dried to be an adhesive layer having a thickness of 2 μm, thereby giving a transfer sheet of Example 1. The refractive index of the adhesive layer was 1.49.
<Adhesive Layer Forming Coating Liquid>

| Acrylic resin (solid content: 20%) (ethyl acetate/n-propyl acetate/methyl ethyl ketone mixed solvent) | 100 parts by mass |
| --- | --- |
| Methyl ethyl ketone | 40 parts by mass |

On a transparent acrylic sheet of an adherend (available from Kuraray Co., Ltd., trade name: Comoglas DK3, thickness 2 mm, refractive index 1.49), the transfer layer was put in such a manner that the surface of the adhesive layer side could face the adherend side, and pressed under heat from the support side of the transfer sheet to thereby airtightly adhere the adherend to the transfer sheet and thus the two were laminated. Next, the release sheet of the transfer sheet was released (peeled) from the laminate, and then UV-irradiated (in air, H bulb, 800 mJ/cm²) to completely cure the protective layer, thereby giving a decorative molded article of Example 1.

Examples 2 to 7

Transfer sheets of Examples 2 to 7 were produced in the same manner as in Example 1 except that the plate and the thickness of the release layer were changed as in Table 2. In addition, decorative molded articles of Examples 2 to 7 were produced in the same manner as in Example 1 except that the transfer sheet of Example 1 was changed to any of the transfer sheets of Examples 2 to 7.

Comparative Example 1

On a polyethylene terephthalate film (support) having a thickness of 50 μm, a matt layer-forming coating liquid of the following formulation was applied so that the thickness thereof after dried could be 2.5 μm to form a coating layer, and then, a smooth release film having an opening corresponding to a region P was stuck to the coating layer. While the release film was kept stuck, this was aged at room temperature (25° C.) for 72 hours to give a laminate A having a pre-cured matt layer. The laminate A was aged at 40° C. for 96 hours so that the matt layer was completely cured, and then the release film was peeled to give a transfer sheet of Comparative Example 1. The surface of the transfer sheet has an uneven region P' and a nearly smooth region Q' surrounding the region P'.

Next, in the same manner as in Example 1 except that the transfer sheet of Example 1 was changed to the transfer sheet of Comparative Example 1, a decorative molded article of Comparative Example 1 was produced.

<Matt Layer Forming Coating Liquid>

| | |
|---|---|
| Acryl polyol (solid content: 50% by mass) | 40 parts by mass |
| Filler (melamine-formaldehyde condensate particles, average particle size: 1.2 μm) | 4 parts by mass |
| Isocyanate (solid content: 75%) | 14 parts by mass |
| Ethyl acetate | 40 parts by mass |

Comparative Example 2

The release film of the laminate A produced in Comparative Example 1 was peeled, and onto the peeled surface, the release layer coating liquid of the above-mentioned formulation was applied so as to have a thickness after dried of 0.5 μm, and then this was aged and cured at 40° C. for 96 hours, the pre-cured matt layer was thus completely cured, and a release layer was formed to give a release sheet for use in Comparative Example 2.

Next, in the same manner as in Example 1 except that the release sheet of Example 1 was changed to the release sheet of Comparative Example 2, a transfer sheet and a decorative molded article of Comparative Example 2 were produced.

Comparative Example 3

In the same manner as in Example 1 except that the abrasive grains were changed to an amorphous iron powder having an average particle size of 90 μm and that the plate and the thickness of the release layer were changed as in Table 2, a transfer sheet and a decorative molded article of Comparative Example 3 were produced.

3. Measurement, Evaluation

The transfer sheets obtained in Examples and Comparative Examples were evaluated and measured as follows. The results are shown in Table 1.

3-1. Measurement of Luminous Reflectance

A black plate was stuck to the surface on the adherend side of the decorative molded article via a transparent pressure-sensitive adhesive layer to prepare a sample A. The sample was so controlled that the refractive index difference among the adherend, the transparent pressure-sensitive adhesive agent and the black plate could be 0.05 or less. In this Example, the adherend, the transparent pressure-sensitive adhesive layer and the black plate all had the same refractive index, 1.49.

Next, a visible light was made to run through the uneven surface (region P) at an angle tilted by 10 degrees from the normal direction of the sample A, and based on the specular direction of the incident light as a reference angle, the luminous reflectance (Y value of the XYZ color system of CIE1931) was measured every 0.2 degrees within a range of the reference angle±5.0 degrees.

As a measuring device for the luminous reflectance, a three-dimensional deflection spectrophotometric colorimeter system (available from Murakami Color Research Laboratory Co., Ltd., trade name: GCMS-11) was used, and the light-accepting angle was −10 degrees.

Next, based on the measured data, a slope of the approximate curve of the requirement 1-1, a standard deviation of an absolute value of the difference of the requirement 1-2, and an average value of the absolute value of α were calculated.

A visible light inclined by 10 degrees from the normal direction of the sample A was made to run into the nearly smooth region Q, and based on the specular direction of the incident light as a reference angle, a luminous reflectance (Y value of the XYZ color system of CIE1931) was measured every 0.2 degrees within a range of the reference angle±5.0 degrees.

The luminous reflectance $Y_0$ in the regions P and Q, as well as the slope of the approximate curve in the region P, the standard deviation of the absolute value of the difference and the average value of the absolute value of α are shown in Table 2. The samples where the absolute value of α is more than 5.0 are expressed as "-".

3-2. Uniformity of Brightness

The surface on the transparent acrylic sheet side of the decorative molded article obtained in Examples and Comparative Examples was stuck to the screen of a liquid crystal display device, the light was put ON, and at a position separated by 50 cm from the liquid crystal display device and at the position facing the screen, the uniformity of the brightness of the screen image at the center of the viewing field in the region P of the decorative molded article was visually observed.

The samples such that the brightness of the screen image at the center of the viewing field in the region P was uniform were given 3 points; those that could not be said either way were given 2 points; and those such that the brightness at the center of the viewing field in the region P seemed to be non-uniform were given 1 point. 20 exam monitors evaluated all the samples in that manner, and an average point was calculated.

<Evaluation Standard>

A: The average point was 2.5 or more.
B: The average point was 1.5 or more and less than 2.5.
C: The average point was less than 1.5.

3-3. Whitening

The surface on the transparent acrylic sheet side of the decorative molded article obtained in Examples and Comparative Examples was stuck to the printed surface of a black acrylic resin plate printed with an image. In a light room with a fluorescent lamp kept put on, the uneven part on the region P of the protective layer of the decorative molded article was visually observed.

The samples having an extremely good contrast between the black background and the image were given 3 points; those having a good contrast between the black background and the image were given 2 points; and those having a bad contrast between the black background and the image were given 1 point. 20 exam monitors evaluated all the samples in that manner, and an average point was calculated.

<Evaluation Standard>

A: The average point was 2.5 or more.
B: The average point was 1.5 or more and less than 2.5.
C: The average point was less than 1.5.

3-4. Sparkle

The surface on the transparent acrylic sheet side of the decorative molded article obtained in Examples and Comparative Examples was stuck to the screen of a liquid crystal display device, the light was put ON, and the fluctuation in fine brightness of the screen image in the region P of the decorative molded article was visually evaluated.

The samples having no brightness fluctuation at all in the screen image were given 3 points: those having little fluctuation in fine brightness were given 2 points; and those having a definite fluctuation in fine brightness were given 1 point. 20 exam monitors evaluated all the samples in that manner, and an average point was calculated.

<Evaluation Standard>
A: The average point was 2.5 or more.
B: The average point was 1.5 or more and less than 2.5.
C: The average point was less than 1.5.

3-5. Design Decorativeness

The surface on the transparent acrylic sheet side of the decorative molded article obtained in Examples and Comparative Examples was stuck to the screen of a liquid crystal display device, the light was put ON, and the region P and the region Q of the decorative molded article were visually observed.

The samples having an extremely good contrast between the region P and the region Q were given 3 points; those having a good contrast between the region P and the region Q were given 2 points; and those having a bad contrast between the region P and the region Q were given 1 point. 20 exam monitors evaluated all the samples in that manner, and an average point was calculated.

<Evaluation Standard>
A: The average point was 2.5 or more.
B: The average point was 1.5 or more and less than 2.5.
C: The average point was less than 1.5.

invention can uniformize brightness, and therefore can be favorably used as a decorative molded article to be arranged in front of display devices.

REFERENCE SIGNS LIST

10: Adherend
21: Protective Layer
22: Adhesive Layer
20: Transfer Layer
31: Support
32: Resin Layer
30: Release Sheet
100: Decorative Molded Article
200: Transfer Sheet
300: Pressure-Sensitive Adhesive Sheet
400: Black Plate
500: Sample A

The invention claimed is:

1. A decorative molded article comprising a protective layer having an area including an uneven surface, the protective layer provided on an adherend, and satisfying the following requirement 1-1:

<Requirement 1-1>

A black plate is stuck to the surface of the article on the adherend side thereof via a transparent pressure-sensitive adhesive layer to prepare a sample A; a visible light inclined by 10 degrees from the normal direction of the sample A is made to run into the uneven surface, and based on the specular direction of the incident light as a reference angle, a luminous reflectance is measured every 0.2 degrees within a range of the reference angle±5.0 degrees; when the luminous reflectance at −5.0 degrees relative to the reference angle is represented by $Y_{-5.0}$ and the luminous reflectance at −4.8

TABLE 2

| | | Region P | | | | | Region Q | Evaluation | | | |
|---|---|---|---|---|---|---|---|---|---|---|---|
| | | Thickness of Release Layer (μm) | Slope of Approximate Curve | Standard Deviation of Difference (%) | α (degree) | $Y_0$ (%) | $Y_0$ (%) | Brightness Uniformity | Whitening | Sparkle | Design Decorativeness |
| Example 1 | Plate A | 0.3 | −0.98 | 1.14 | 4.8 | 0.77 | 4.00 | A | B | B | A |
| Example 2 | Plate A | 0.5 | −1.14 | 0.71 | 4.6 | 0.94 | | A | A | A | A |
| Example 3 | Plate A | 0.6 | −1.51 | 0.88 | 3.8 | 1.23 | | A | A | A | A |
| Example 4 | Plate A | 0.7 | −1.14 | 1.16 | 4.0 | 1.05 | | A | A | A | A |
| Example 5 | Plate B | 0.7 | −1.14 | 0.78 | 4.6 | 0.94 | | A | A | A | A |
| Example 6 | Plate B | 0.9 | −1.45 | 0.82 | 4.0 | 1.11 | | A | A | A | A |
| Example 7 | Plate C | 0.5 | −1.81 | 1.10 | 3.6 | 1.48 | | A | A | A | A |
| Comparative Example 1 | — | — | −2.42 | 1.99 | 2.8 | 1.37 | | C | B | C | A |
| Comparative Example 2 | — | — | −2.82 | 2.39 | 2.6 | 1.63 | | C | A | C | B |
| Comparative Example 3 | Plate D | 0.1 | −0.80 | 1.15 | — | 0.62 | | A | C | B | A |

The results in Table 1 confirm that the decorative molded articles of Examples 1 to 7 can uniformize the in-plane brightness of the uneven surface and can inhibit whitening.

INDUSTRIAL APPLICABILITY

The decorative molded article of the present invention can be favorably used as members constituting communication devices such as mobile phones, in-car information devices, home electric appliances, and various display devices. In particular, the decorative molded article of the present degrees is represented by $Y_{-4.8}$, a value represented by an expression of $[(Y_{-4.8}-Y_{-5.0})/((Y_{-4.8}+Y_{-5.0})/2)]\times 100$ is defined as a change rate of the luminous reflectance at −5.0 degrees; and when a change rate of the luminous reflectance at every measurement angle in a range of −5.0 degrees to +4.8 degrees is calculated according to the expression and an approximate straight line is drawn according to a least-square method in which the x-axis indicates the measurement angle and the y-axis indicates the change rate, the slope of the approximate straight line is −2.00 or more and −0.90 or less.

2. The decorative molded article according to claim 1, further satisfying the following requirement 1-2:
<Requirement 1-2>
When an absolute value of a difference between a value of the luminous reflectance calculated from the approximate straight line and a measured value of the luminous reflectance at each measurement angle is calculated with respect to each measurement angle in a range of the reference angle±5.0 degrees, a standard deviation of the absolute value of the difference calculated in the range±5.0 degrees is 0.50 to 1.60%.

3. The decorative molded article according to claim 1, further satisfying the following requirement 1-3:
<Requirement 1-3>
When the angle that indicates a ½ luminous reflectance of the luminous reflectance at the reference angle is represented by $\alpha$, an average of the absolute value of $\alpha$ is 2.5 to 5.0 degrees.

4. The decorative molded article according to claim 1, further satisfying the following requirement 1-4:
<Requirement 1-4>
The luminous reflectance $Y_0$ at the reference angle is 2.0% or less.

5. The decorative molded article according to claim 1, wherein the protective layer has a region P having an uneven surface and a region Q adjacent to the region P, and the region P and the region Q satisfy the following requirement 1-5:

<Requirement 1-5>
A visible light inclined by 10 degrees from the normal direction of the sample A is made to run through the surface in the region P and the region Q of the sample A, and based on the specular direction of the incident light as a reference angle, the luminous reflectance is measured every 0.2 degrees in a range of the reference angle±5.0 degrees; and when the luminous reflectance at the reference angle in the region P is represented by $Y_{OP}$ and the luminous reflectance at the reference angle in the region Q is by $Y_{OQ}$, $Y_{OQ}-Y_{OP}$ is 1.5% or more.

6. The decorative molded article according to claim 3, the average of the absolute value of $\alpha$ is 3.5 to 5.0 degrees.

7. The decorative molded article according to claim 1, a haze according to JIS K7136:2000 of the area having the uneven surface of the decorative molded article is 5 to 40%.

8. The decorative molded article according to claim 1, the decorative molded article comprising an adhesive layer between the protective layer and the adherend.

9. The decorative molded article according to claim 8, the decorative molded article comprising an anchor layer between the protective layer and the adhesive layer.

10. The decorative molded article according to claim 1, the decorative molded article comprising a print layer between the protective layer and the adherend.

11. A display device having a decorative molded article of claim 1 on the front surface of a display element.

* * * * *